W. A. CROWDUS.
ELECTROMAGNETIC DEVICE.
APPLICATION FILED FEB. 1, 1909. RENEWED DEC. 11, 1909.

962,129.

Patented June 21, 1910.
3 SHEETS—SHEET 1.

Witnesses:
John Enders
Chas. H. Buell.

Inventor:
Walter A. Crowdus,
By Dyrenforth, Lee, Chritton & Wiles
Attys.

W. A. CROWDUS.
ELECTROMAGNETIC DEVICE.
APPLICATION FILED FEB. 1, 1909. RENEWED DEC. 11, 1909.
962,129.
Patented June 21, 1910.
3 SHEETS—SHEET 2.
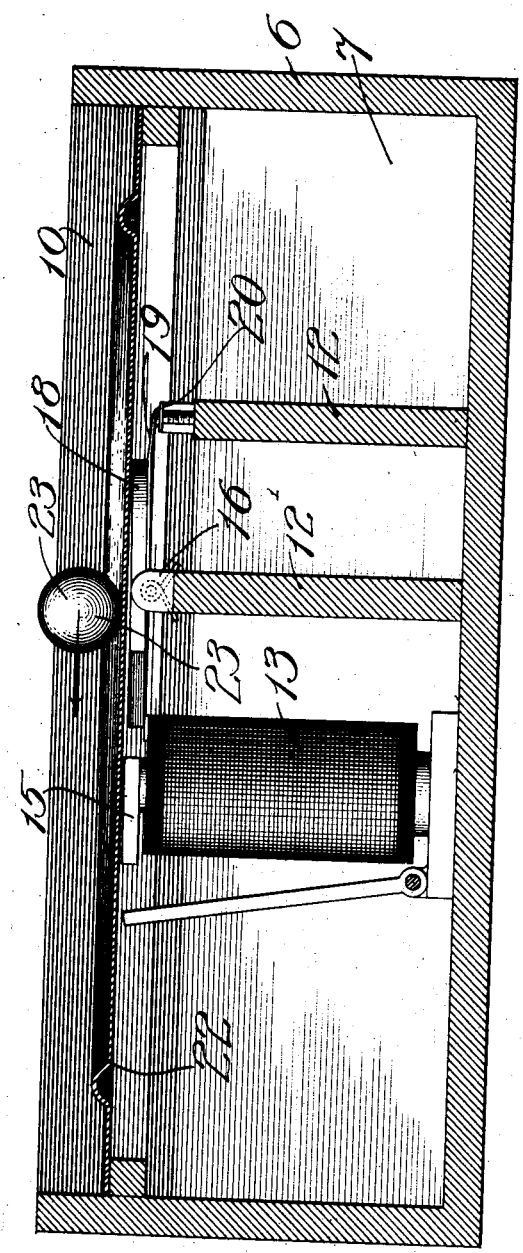
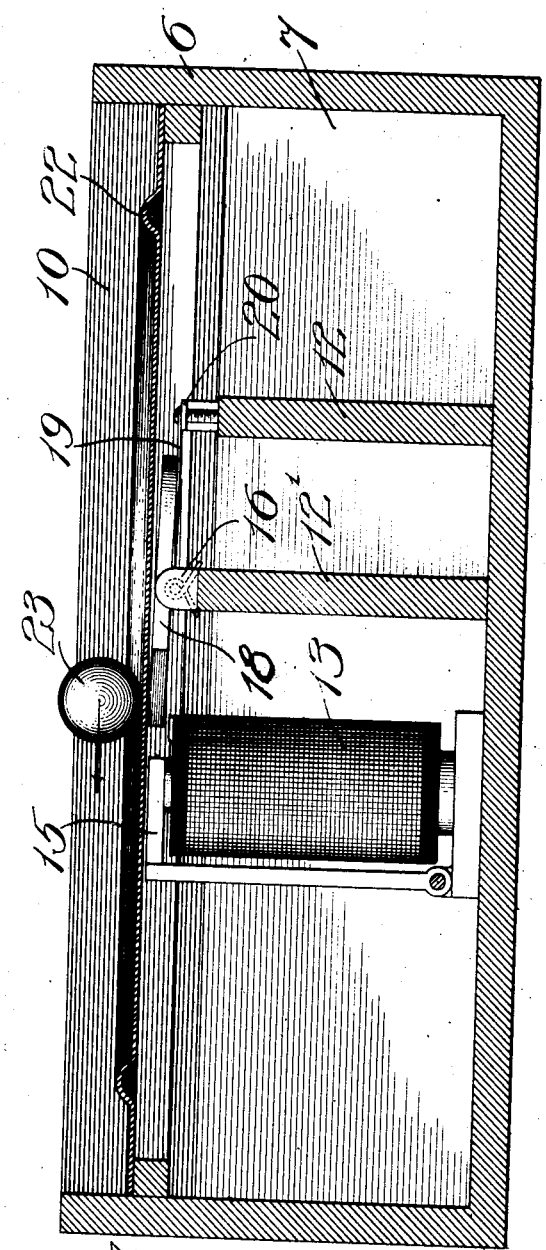
Witnesses:
John Enders
Chas. H. Buell
Inventor:
Walter A. Crowdus.
By Dyrenforth, Lee, Chritton & Wiles
Attys.

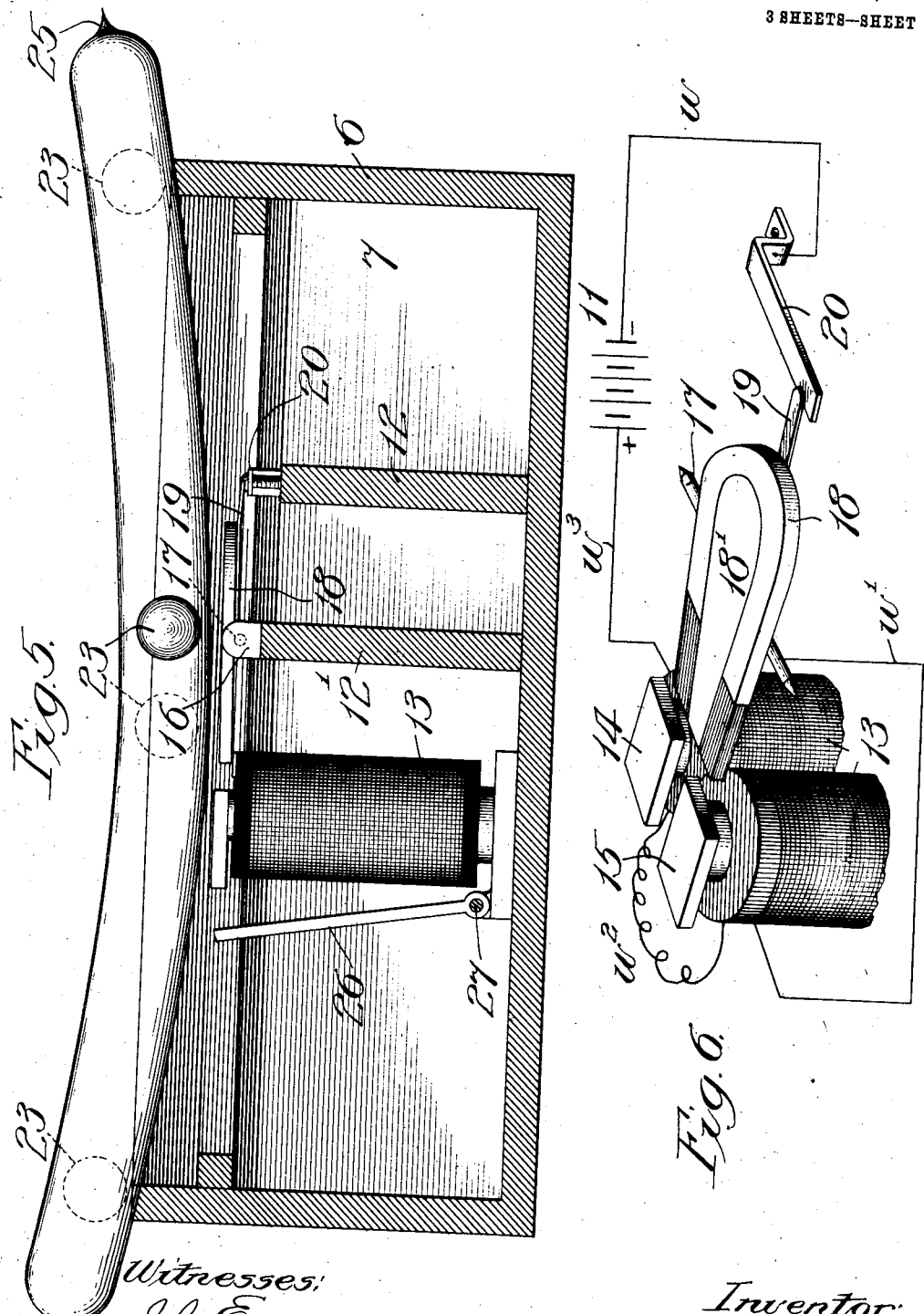

UNITED STATES PATENT OFFICE.

WALTER A. CROWDUS, OF CHICAGO, ILLINOIS.

ELECTROMAGNETIC DEVICE.

962,129.  Specification of Letters Patent.  Patented June 21, 1910.

Application filed February 1, 1909, Serial No. 475,523. Renewed December 11, 1909. Serial No. 532,680.

*To all whom it may concern:*

Be it known that I, WALTER A. CROWDUS, a citizen of the United States, residing at Chicago, in the county of Cook and State of Illinois, have invented a new and useful Improvement in Electromagnetic Devices, of which the following is a specification.

My invention, in its broadest conception, is an electric circuit opened and closed by the movements of a movable magnet actuated by a magnetic body in moving through the magnetic field under the stress of power resulting from such circuit-closure.

I have primarily devised my invention for amusement (toy) and advertising purposes, and more especially for use as a means of accurately testing and registering time; but these form mere examples of many different uses to which it may be adapted for the transmission of power.

Two forms of embodiment of my invention are illustrated in the accompanying drawings, in which—

Figure 1:
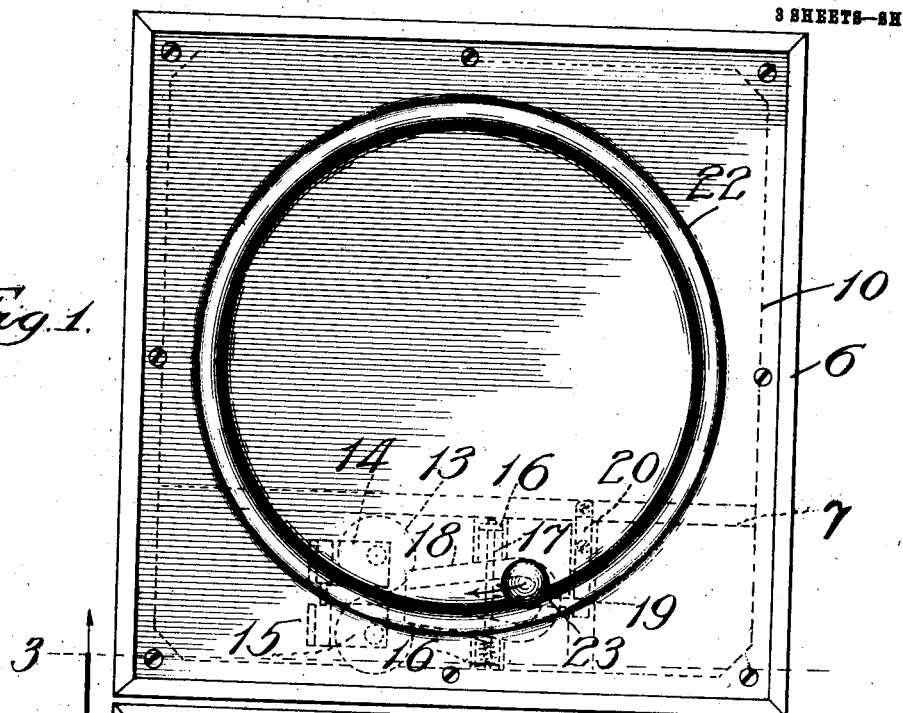
Figure 2:
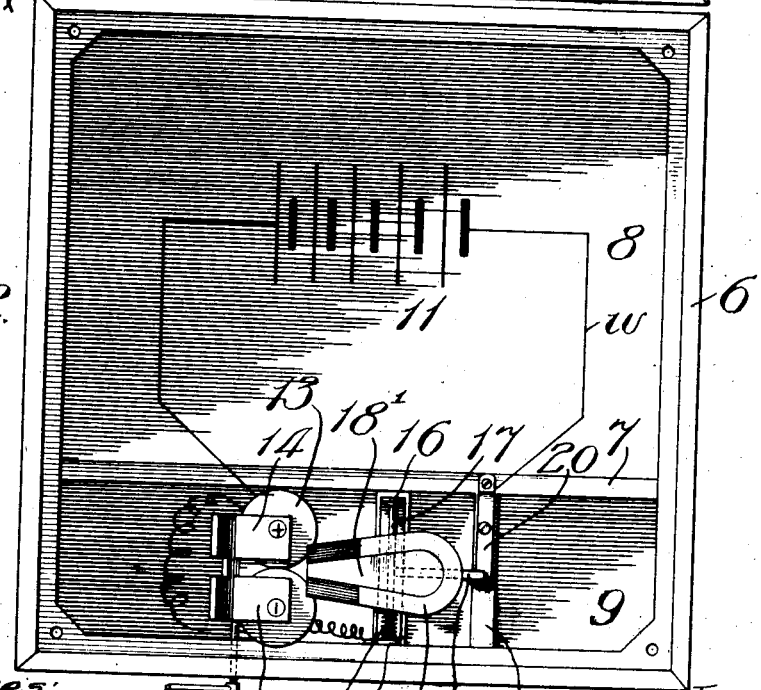

Figure 1 is a plan view of one form of the device, showing the movable magnetic body as a ball on the cover of a case with the mechanism which coöperates with it, contained in the case, in dotted representation; Fig. 2 is a similar view of the same with the cover removed to display the mechanism in the case; Figs. 3 and 4 are similar enlarged sections on line 3, Fig. 1, respectively showing the horseshoe or permanent magnet in its normal circuit-opening and its circuit-closing positions; Fig. 5 is a view like that presented in Fig. 3, but showing the other of the two forms, referred to, of the embodiment of my invention, and Fig. 6 is a broken perspective view showing the electromagnet in its relation to the pivotal circuit-closing horseshoe-magnet in the electric circuit, represented diagrammatically, of a generator, shown conventionally.

The device is shown to involve a case or box 6 containing a vertical partition 7 dividing it into compartments 8 and 9, the case of Figs. 1 to 4, inclusive, being provided with a cover 10, which may be formed of brass or other suitable non-magnetic material. In the compartment 8 may be contained a suitable electric-current generator, indicated at 11, a desirable form thereof being a battery of dry-cells (not shown). The other compartment 9, in which transverse partitions 12 and $12^1$ extend, forming supports, contains an electromagnet 13, shown to comprise two spools with horizontal extensions, 14 and 15, of the upper ends of their respective poles. In bearings 16 rising from the support $12^1$ is journaled at its ends, in a manner to reduce friction to the minimum, a spring-retracted shaft 17. A magnet 18, which is preferably of the permanent variety, that shown being of the ordinary horseshoe type containing a wooden filler $18^1$, (though it might be an electromagnet in a closed exciting-circuit) is secured between its ends at the filler on the shaft 17 to rock with it and cause the poles to coincide, respectively, with the corresponding poles of the electromagnet 13 and extend into somewhat close proximity to them; and a contact-finger 19 projects from the shaft underneath and beyond the opposite end of the magnet 18 to engage a terminal 20 on the partition 7 and support 12.

The cover 10 is provided about its center with a circular head 22 forming about its inner circumference a ball-race, path or track which intersects the magnetic field of the magnet 18, and on which a ball 23 of magnetic material, as steel or iron, is shown to be imposed.

The circuit may be traced on Fig. 6 as follows: from the positive pole of the generator 11 through the wire $w$ to the terminal 20, through the contact-finger 19, shaft 17 and wire $w^1$ to the electromagnet, through the latter by the wire-connection $w^2$ between its spools, and back to the negative pole of the generator through the wire $w^3$.

The power of the electromagnet 13 is, for the reason which will hereinafter appear, materially greater than that of the magnet 18; and the operation to cause the ball to travel continuously in one direction about its path on the cover is the following: After starting the ball by hand, each time it enters the field of the magnet 18, being prevented by the interposed track from being attracted to the magnet-poles, it will raise them, thereby turning the magnet in the direction to engage the finger 19 with the terminal 20 and close the circuit, thus energizing the electromagnet to cause its pole-pieces 14, 15 to attract the ball. This attraction imparts a propelling impulse to the ball sufficient to completely carry it around its course, in which it again comes into the field of the magnet 18, repeating the circuit-closure and starting-action of the electromagnet. As will be understood, each time the ball is attracted past the weaker magnet 18 by the force of the more powerful electromagnet, the former is immediately returned to its normal position under the retractive force upon the shaft 17 of its controlling-spring 17¹ (Fig. 2), and thus opens the circuit, thereby instantaneously deënergizing the electromagnet to avoid exertion by its pole-pieces of stoppage or drag upon the ball in crossing them.

The embodiment of the invention for performing the operation thus described is best adapted for amusement and advertising purposes. In the embodiment of the same illustrated in Fig. 5 the cover 10 may be omitted and the path or track for the ball is one for permitting it to reciprocate, or oscillate like a pendulum, being formed of a glass tube 24 bent to describe an arc of a circle of proper radius and adapted to seat near its ends on opposite walls of the case in position to extend through the field of the magnet 18. To reduce to the minimum resistance to the movements of the ball in the tube, air may be exhausted therefrom to produce within it a partial vacuum maintainable by sealing the tube-ends, as indicated at 25. This partial vacuum is desirable for diminishing air-resistance to the ball, which in crossing the poles of the magnet 13 in the direction toward the electromagnet closes the circuit in the manner already described to energize the electromagnet, the pole-pieces of which attract and impart the described impulse to the ball to drive it up the inclined tube as far as its inertia will carry it, from which point it rolls in the opposite direction to or about to the same distance from the opposite end of the tube. In the return-course of the ball it first crosses the deënergized poles 14 and 15, and then enters the field of the magnet 18, thereby causing closure of the circuit and momentarily energizing the electromagnet, but without effect therefrom on the ball, which has meantime passed out of its influence and cleared the field of the magnet 18, the latter being insufficiently strong to hold or appreciably retard it; and when the ball, in passing out of that field, clears the magnet 18 it momentarily opens the circuit in the manner already described.

In Fig. 5 is represented one of many forms of means that may be employed for transmitting the power of the electromagnet 13 to perform work, such as regularly oscillating the pendulum, or controlling the escapement-wheel of a clock, and the like. The means illustrated comprise an armature 26 supported to extend with its free end adjacent to the pole-pieces of the electromagnet, on a spring-retracted rock-shaft 27 journaled at its ends in suitable bearings, one of which is shown at 28, to cause energizing and deënergizing the electromagnet to oscillate the armature and with it the shaft, which may be extended, as indicated, to engage the mechanism to be worked.

It will be apparent from the foregoing description of my invention that it involves, as a new principle of operation, that of closing, without manual means, an electric circuit by the motion of a magnetic body each time it moves through a magnetic field in its path, to cause the power of the circuit to perform work; and that a portion of the power of the energized circuit is used to again effect opening thereof. In fact, my invention amounts to a method of producing rotary or oscillatory motion of a body of magnetic material by subjecting it to magnetic impulses through the action of a permanent magnet caused by said body in moving to energize and deënergize an electromagnet.

Reference herein to opening and closing the electric circuit and to a circuit-closer for the purpose is intended to include any change in the circuit that will effect the operation on the principle of my invention.

What I claim as new and desire to secure by Letters Patent is—

1. A device of the character set forth, comprising an electric circuit, a circuit-breaker in said circuit, a movable magnet coöperating with said circuit-breaker, and a magnetic body supported to move through the magnetic field of the movable magnet and thereby actuate said magnet, for the purpose set forth.

2. A device of the character set forth, comprising an electric circuit, a circuit-breaker in said circuit, a magnet oscillatorily supported to coöperate with said circuit-breaker, and a magnetic body supported to move through the magnetic field of the movable magnet and thereby actuate said magnet, for the purpose set forth.

3. A device of the character set forth, comprising a case, an electric circuit in said case, a circuit-breaker in said circuit, a movable magnet coöperating with said circuit-breaker, a support on said case for a movable body, and a magnetic body movable on said support through the magnetic field of the movable magnet to actuate said magnet, for the purpose set forth.

4. A device of the character set forth, comprising an electric circuit, means in said circuit for transmitting power therefrom, a circuit-breaker in said circuit, a movable magnet coöperating with said circuit-breaker, and a magnetic body supported to move through the magnetic field of the movable magnet and thereby actuate said magnet, for the purpose set forth.

5. A device of the character set forth, comprising a propellable magnetic body, an electric circuit, an electromagnet in said circuit adapted to propel said body, and magnet-controlled circuit-controlling means operatively influenced by said body in moving, for the purpose set forth.

6. A device of the character set forth, comprising a propellable magnetic body, an electric circuit, an electromagnet in said circuit adapted to propel said body and provided with means for transmitting power when energized, and magnet-controlled circuit-controlling means operatively influenced by said body in moving, for the purpose set forth.

7. A device of the character set forth, comprising an electric circuit, an electromagnet in said circuit, magnet-controlled circuit-controlling means in said circuit, a magnetic body supported to move through the field of the magnet of said controlling means and that of said electromagnet to actuate said magnet and be propelled by said electromagnet, for the purpose set forth.

8. A device of the character described, comprising an electric circuit containing a terminal, an electromagnet in said circuit, an oscillatorily-supported relatively-weaker magnet extending with its poles adjacent to those of said electromagnet, a contact-finger movable with said magnet relative to said terminal, and a magnetic body supported to move relative to the poles of said magnet to actuate it and relative to the poles of said electromagnet to be propelled, for the purpose set forth.

9. A device of the character described, comprising an electric circuit containing a terminal, an electromagnet in said circuit, a relatively-weaker magnet supported on a rock-shaft to extend its poles into proximity to those of said electromagnet, a contact-finger carried by said rock-shaft and coöperating with said terminal, and a magnetic body supported to move relative to the poles of said magnet to actuate it and relative to the poles of said electromagnet to be propelled, for the purpose set forth.

10. A device of the character described, comprising an electric circuit containing a terminal, an electromagnet in said circuit provided with pole-extensions, an oscillatorily-supported armature coöperating with said extensions, a relatively-weaker magnet supported on a rock-shaft to extend its poles into proximity to those of said electromagnet, a contact-finger carried by said rock-shaft and coöperating with said terminal, and a magnetic body supported to move relative to the poles of said magnet to actuate it and relative to the pole-extensions of said electromagnet to be propelled, for the purpose set forth.

11. A device of the character described, comprising an electric circuit containing a terminal, an electromagnet in said circuit, an oscillatorily-supported relatively-weaker magnet extending with its poles adjacent to those of said electromagnet, a contact-finger movable with said magnet relative to said terminal, a track supported to extend through the magnetic fields emanating from said poles, and a magnetic body movably supported on said track, for the purpose set forth.

12. A device of the character described, comprising a case, an electric circuit containing a terminal, an electromagnet in said circuit, an oscillatorily-supported relatively-weaker magnet extending with its poles adjacent to those of the electromagnet, a contact-finger movable with said magnet relative to said terminal, a track supported on the case to extend over said poles and through the magnetic fields thereof, and a magnetic body movably supported on said track, for the purpose set forth.

13. A device of the character described, comprising a case, an electric circuit containing a terminal, an electromagnet in said circuit, a permanent horseshoe-magnet oscillatorily supported between its ends in the case to extend with its poles adjacent to those of said electromagnet, a contact-finger movable with said horseshoe-magnet relative to said terminal, a track supported on the case to extend over the poles of said electromagnet and horseshoe-magnet and through their magnetic fields, and a magnetic body movably supported on said track, for the purpose set forth.

14. A device of the character described, comprising a case, an electric circuit containing a terminal, an electromagnet in said circuit, an oscillatorily-supported relatively-weaker magnet extending with its poles adjacent to those of the electromagnet, a contact-finger movable with said magnet relative to said terminal, a track supported on the case to extend over said poles and through the magnetic fields thereof, and a ball of magnetic material supported to roll on said track, for the purpose set forth.

WALTER A. CROWDUS.

In presence of—
R. A. SCHAEFER,
R. A. RAYMOND.